US008714481B2

(12) United States Patent
Sweet et al.

(10) Patent No.: US 8,714,481 B2
(45) Date of Patent: May 6, 2014

(54) INTEGRATED ELECTRIC MOTOR AND GEAR IN AN AIRCRAFT WHEEL

(75) Inventors: Robert M. Sweet, Beaver, UT (US); Neal Gilleran, Long Beach, CA (US); Jonathan Sidney Edelson, North Plains, OR (US); Isaiah Watas Cox, Baltimore, MD (US); Rodney T. Cox, North Plains, OR (US)

(73) Assignee: Borealis Technical Limited (GI)

( * ) Notice: Subject to any disclaimer, the term of this patent is extended or adjusted under 35 U.S.C. 154(b) by 561 days.

(21) Appl. No.: 13/082,932

(22) Filed: Apr. 8, 2011

(65) Prior Publication Data
US 2011/0297786 A1   Dec. 8, 2011

Related U.S. Application Data

(60) Provisional application No. 61/342,166, filed on Apr. 8, 2010.

(51) Int. Cl.
*B64C 25/50* (2006.01)
(52) U.S. Cl.
USPC .................................. 244/103 R; 244/100 R
(58) Field of Classification Search
USPC ......................... 244/103 R, 100 R, 129.1, 50
See application file for complete search history.

(56) References Cited

U.S. PATENT DOCUMENTS

| | | | | |
|---|---|---|---|---|
| 2,430,163 A | * | 11/1947 | Dever | 310/67 R |
| 3,977,631 A | * | 8/1976 | Jenny | 244/50 |
| 7,226,018 B2 | * | 6/2007 | Sullivan | 244/111 |
| 7,445,178 B2 | * | 11/2008 | McCoskey et al. | 244/50 |
| 8,136,761 B2 | * | 3/2012 | Kiyosawa | 244/103 R |
| 8,360,360 B2 | * | 1/2013 | Cros et al. | 244/103 R |
| 8,474,749 B2 | * | 7/2013 | Cros et al. | 244/50 |
| 8,485,466 B2 | * | 7/2013 | Charles et al. | 244/50 |
| 8,579,229 B2 | * | 11/2013 | Nierlich | 244/50 |
| 2009/0114765 A1 | * | 5/2009 | Cox et al. | 244/50 |
| 2011/0155846 A1 | * | 6/2011 | Bulin et al. | 244/50 |
| 2012/0001018 A1 | * | 1/2012 | Gilleran et al. | 244/50 |
| 2013/0062466 A1 | * | 3/2013 | Sweet et al. | 244/103 R |

* cited by examiner

*Primary Examiner* — Christopher P Ellis

(57) ABSTRACT

A wheel design is provided for an aircraft landing gear wheel that is configured to maximize the space available within a landing gear wheel well to support a geared motor assembly that drives the aircraft wheel when the aircraft is on the ground. The wheel includes inboard and outboard support walls that are spaced apart a selected distance along the wheel axle so that the geared motor assembly components are substantially completely contained within the wheel space defined by the support walls. The preferred motor driver assembly includes an electric motor and a gear and clutch assembly operatively connected to the wheel to drive the wheel and move the aircraft on the ground. The wheel and motor driver assembly described herein may be retrofitted in an existing aircraft wheel without changing existing landing gear components, including tires, piston, and axle.

18 Claims, 3 Drawing Sheets

INTEGRATED ELECTRIC MOTOR AND GEAR IN AN AIRCRAFT WHEEL

This application is based on and claims priority from U.S. Provisional Patent Application No. 61/342,166, filed 8 Apr. 2010, the disclosure of which is fully incorporated herein.

TECHNICAL FIELD

The present invention relates generally to wheel structures adapted to support a motor integrally within the volume of the wheel structure and, specifically, to an aircraft wheel configured to support an electric motor and gear designed to be mounted within an aircraft wheel well to drive the aircraft wheel.

BACKGROUND OF THE INVENTION

As air travel has increased over the past decades, airport facilities have become more crowded and congested. Minimizing the time between the arrival of an aircraft and its departure to maintain an airline's flight schedule, and also to make a gate or parking location available without delay to an incoming aircraft, has become an airline priority. The safe and efficient ground movement of a large number of aircraft simultaneously into and out of the ramp and gate areas has become increasingly important. As airline fuel costs and safety concerns and regulations have increased, use of the aircraft main engines is no longer the best option for achieving the desired safe and efficient ground movement.

Various alternatives to the use of an aircraft's main engines to move an aircraft on the ground have been tried. The use of a tug or tow vehicle to move an aircraft into and out of a gate or parking location can eliminate the need to use the aircraft main engines. This option, however, is not without its own challenges and costs. More ground vehicles, requiring more fuel and more ground personnel to operate them, add to an already congested environment in the gate area. Restricted use of the aircraft engines on low power during arrival at or departure from a gate is an additional option. This option is also problematic, however. Not only does engine use consume fuel, it is also noisy, and the associated safety hazards of jet blast and engine ingestion in a congested area are significant concerns that cannot be overlooked.

The use of a motor structure integrally mounted with a wheel to rotate the wheel and drive a vehicle, including an aircraft, has been proposed. The use of such a structure, ideally, could move an aircraft with minimal or no use of an aircraft's main engines. In U.S. Pat. No. 2,430,163, for example, Dever describes a motor that may be incorporated in an aircraft landing gear wheel in which the stator is mounted on a stationary part of a wheel assembly and the rotor is connected to the revolving part of the wheel to produce a high rotating torque near the periphery of the wheel. The structure described by Dever includes disc type wheels with webs that are dished to form a conical space near the hub to accommodate the motor. Dever does not suggest a wheel configuration that maximizes this space. Moreover, Dever does not mention including a gear assembly integrated with the wheel structure described therein.

Other patent art, such as U.S. Pat. No. 3,977,631 to Jenny, also describes drive motors associated with aircraft gear wheels intended to drive an aircraft on the ground. The motor assembly disclosed by Jenny is selectively coupled to an aircraft wheel through a rotatably mounted brake apparatus in which the normally non-rotating stator is rotatably mounted and driven. A reduction gear assembly is included in this arrangement and is positioned to facilitate mounting of a drive motor away from the cramped wheel and brake assembly. The configuration of the wheel itself is not mentioned.

In U.S. Pat. No. 7,445,178, McCoskey et al describe a powered nose aircraft wheel system with a multifunctional wheel motor coupled to the wheel axle and the wheel. The motor, which may be driven by a planetary gear assembly or by a direct drive, is located within the hub of the wheel, and the wheels are free to spin on an axle strut by rim bearings. The stator winding is rigidly fixed to the axle and partially contained by a rotor, which rotates on bearings about the axle. The wheel shape shown by McCoskey et al does not integrate the motor within the wheel, nor is it suggested that wheel supports could be located to maximize the space available for integrating the motor and gearing within the wheel. U.S. Pat. No. 7,226,018 to Sullivan also describes a wheel motor useful in an aircraft landing gear wheel. This wheel hub motor/generator disks stack includes within the stack alternating rotor and stator disks, in which the rotors are coupled to the wheel, and is designed to provide motive force to an aircraft wheel when electric power is applied. Sullivan is silent, however, with respect to both the specific shape of the wheel structure and the integration of a motor and gearing within a wheel structure. None of the foregoing patents suggests a wheel structure that is configured to maximize the limited landing gear space available to integrate within the wheel a compact motor and gear assembly capable of powering an aircraft drive wheel that could be easily installed on an existing aircraft without the modification of other landing gear structures. This art, moreover, does not contemplate a wheel structure shaped to support an integral configuration of the motor and gear components that can be retrofitted in existing aircraft or that provides easy access to the motor components for maintenance and repair when the motor is not in operation.

U.S. Pat. No. 7,469,858 to Edelson, owned in common with the present invention, describes a geared wheel motor design that may be used to move an aircraft from a stationary position for taxiing. Configuring the wheel shape to maximize the volume in which a drive motor and gear assembly may be mounted is not suggested, however.

Published United States patent applications, including U.S. Patent Application Publication Nos. US2006/0273686 to Edelson, US2007/0282491 to Cox et al, US2009/0152055 to Cox, US2009/0261197 to Cox, International Patent Application Publication No. WO 2008/027458 to Cox et al, and British Patent No. 2457144, also owned in common with the present invention, describe aircraft drive systems that use electric drive motors to power aircraft wheels and move an aircraft on the ground. These disclosures focus on specific aspects of the drive systems and motor assemblies, including drive system data, motor design, tire profile, and motor cooling, rather than on a wheel structure specifically configured to maximize space within the wheel well to integrally support motor and gear assembly components and landing gear wheel components without changes to the aircraft landing gear.

A need exists, therefore, for a wheel structure specifically configured to maximize the space available to integrate an electric motor and gear assembly substantially completely within an aircraft wheel without changes to the existing aircraft landing gear components.

SUMMARY OF THE INVENTION

It is a primary object of the present invention, therefore, to provide a wheel structure specifically configured to maximize the space available to support an electric motor and gear assembly and designed to fit integrally within an aircraft wheel without changes to the aircraft landing gear components.

It is another object of the present invention to provide a wheel structure configured to integrate an electric motor and gear assembly with an aircraft gear wheel that does not require replacement of the aircraft's existing axle, wheel, tires, piston, or other landing gear components.

It is an additional object of the present invention to provide a wheel structure configured to support an electric motor and gear integrated with an aircraft gear wheel that does not require change or re-certification for the aircraft's wheel rim width, tire bead, or bead seat and can be retrofitted in an existing aircraft landing gear.

It is a further object of the present invention to provide a wheel structure configured to integrate an electric motor and gear assembly with an aircraft gear wheel assembly that minimizes spin-up weight and maximizes the space available within the landing gear for installation of the motor.

It is yet another object of the present invention to provide an aircraft gear wheel and drive motor assembly design in which the wheel is not structurally supported by the motor or the motor driver.

It is yet a further object of the present invention to provide a wheel configured to support an electric motor and aircraft gear wheel assembly that provides easy access to motor components for maintenance or repair after installation of the assembly.

It is a yet further object of the present invention to provide a wheel structure shaped to support an electric motor and gearing integrated with an aircraft gear wheel that provides a solid thermal connection between the motor and the wheel axle and landing gear piston to facilitate heat dissipation from the motor and wheel assembly.

It is a still further object of the present invention to provide an electric motor assembly and gear system integrated substantially completely within an aircraft landing gear wheel well that is selectively engaged to drive the aircraft on the ground and disengaged when the aircraft is in flight.

In accordance with the aforesaid objects, a wheel structure configured to support an electric motor and gear assembly integrally incorporated into an aircraft landing gear wheel to enable the aircraft gear wheel to be driven on the ground independently of the aircraft main engines is provided. The wheel configuration is designed to maximize the space available in an existing aircraft landing gear wheel well to support a motor, preferably an electric motor, within this space without changing the existing landing gear components. This wheel and geared motor assembly is designed to be selectively engaged to power the wheel within which it is installed to drive the aircraft on the ground and disengaged when the aircraft is in flight. Maintenance, such as tire changes, and service of the motor is much simplified by the configuration of the wheel structure and motor driver assembly of the present invention.

Other objects and advantages will be apparent from the following description, drawings, and claims.

DETAILED DESCRIPTION OF THE INVENTION

The many advantages of being able to drive an aircraft on the ground independently without using the aircraft main engines, as discussed above, have been acknowledged. Integrating a motor and gear assembly, within an aircraft gear wheel as the aircraft is being constructed does not present problems because the space available for landing gear components, including motors for driving gear wheels, can be adjusted as required. Retrofitting existing aircraft presents challenges, however. Because of the unique configuration of the wheel, the integral wheel and geared motor assembly of the present invention overcomes these challenges and provides a wheel and geared motor assembly that can be fitted into the limited space available for aircraft landing gear components without modifying any of the other landing gear components. As a result, an aircraft's existing wheel well, tire, axle, piston, and other landing gear components can be used with this integrated wheel and geared motor assembly. The wheel and geared motor assembly of the present invention is designed to make it possible to retrofit existing aircraft simply and effectively so that these older aircraft can achieve the fuel and cost savings and other advantages of aircraft ground movement that is independent of the aircraft engines and external ground vehicles.

Since landing gears on existing aircraft are already completely designed to function without additional components like electric drive motors and gear assemblies, there is not much space available for a motor, a gear assembly, a clutch, if required, electrical connections, or other structures. Modifications that require changes to the landing gear axle or piston, which have been suggested, would be expensive and time consuming, in large part because any changes from existing structure would require re-certification by regulatory authorities such as the United States Federal Aviation Administration (FAA) and equivalent international regulatory authorities.

Figure 1:
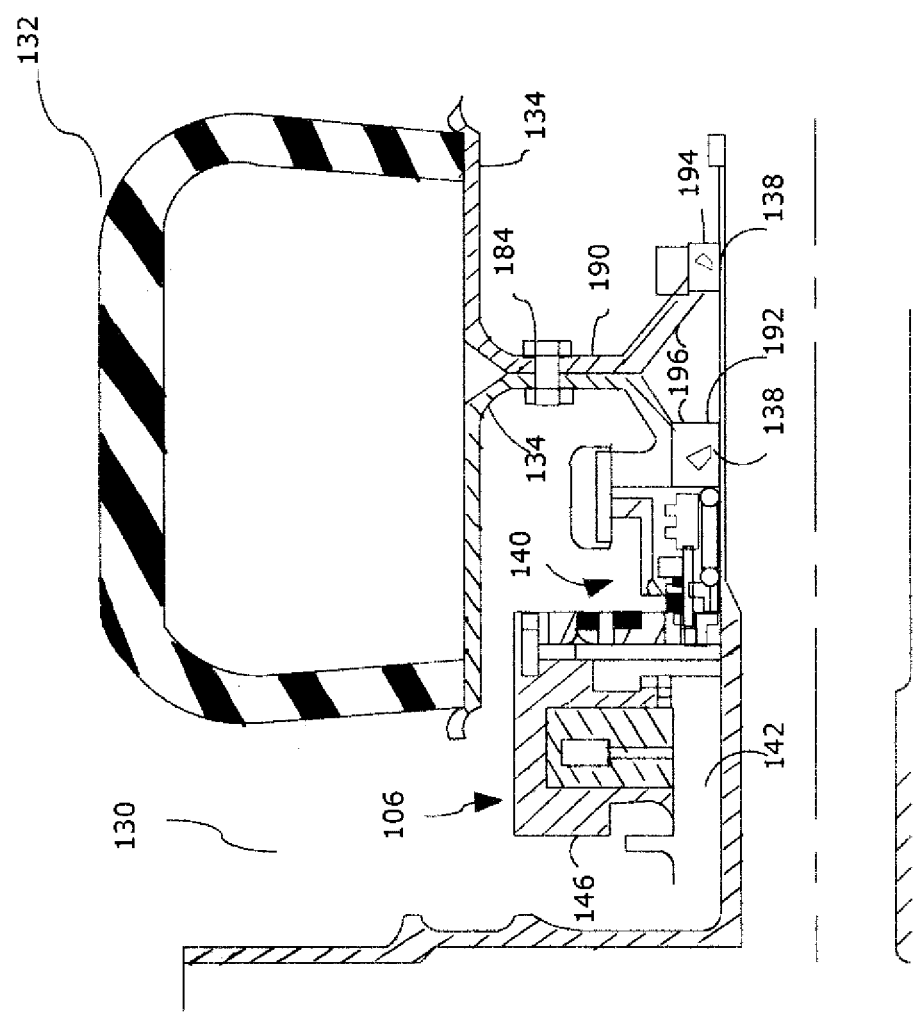
FIG. 1 illustrates a prior art wheel and motor assembly for an aircraft landing gear.

FIG. 1 illustrates one prior art aircraft wheel design, which is described and shown in U.S. Pat. No. 7,445,178. A landing gear system 130 includes a tire 132 attached to a wheel 134. A wheel motor 106 with a rotor 146 and a stator 142 drives the wheel in cooperation with a dual activated cone mechanism 140, gears, and a clutch (not shown). The configuration of the wheel and motor assembly shown in FIG. 1 differs in significant respects from that of the present invention, not the least of which is that this assembly incorporates primarily the wheel support structures and gearing within the space between the wheel and the axle. This arrangement does not maximize the space available to integrate the motor or drive mechanism substantially completely within the wheel. Consequently, as discussed in greater detail below, the arrangement shown in FIG. 1 will not realize the significant advantages of the arrangement of the present invention.

Figure 2:
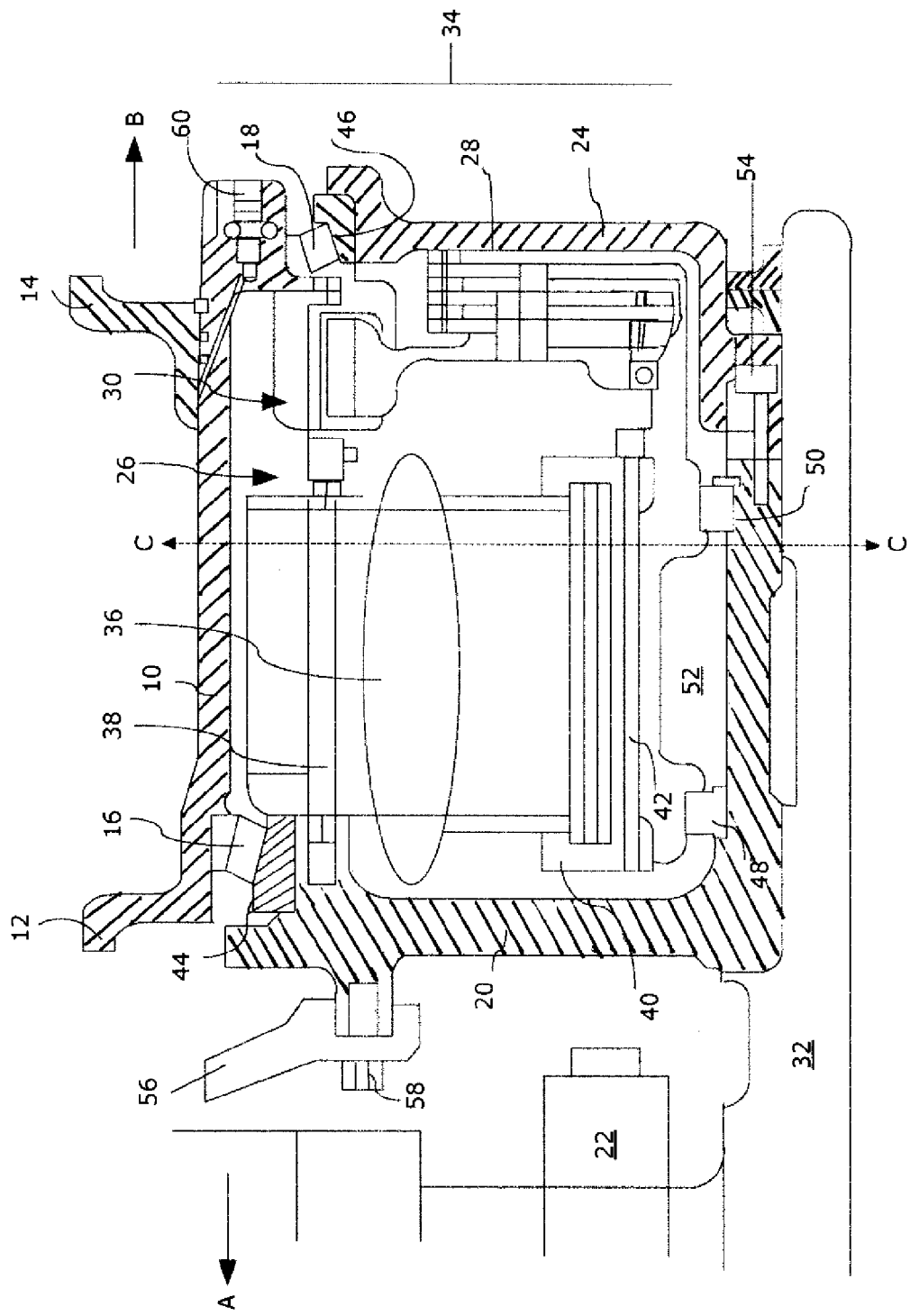
FIG. 2 is a diagrammatic illustration of one embodiment of a wheel in which a motor assembly and gear system are integrated substantially completely within an aircraft landing gear wheel well in accordance with the present invention.

FIG. 2 illustrates diagrammatically a wheel and geared motor assembly according to the present invention. The overall configuration of the present wheel and integrated geared motor assembly differs structurally and functionally from both that shown in FIG. 1 and available aircraft gear wheel designs. In FIG. 2, the arrows A and B indicate, respectively, the inboard and outboard orientation of the assembly with respect to an aircraft landing gear.

FIG. 2 clearly shows that the main wheel 10 of the present wheel and geared motor assembly has a configuration that is different from a common standard wheel shape and from the shape shown in FIG. 1. The common standard wheel shape typically bends inwardly toward the inboard direction from the outer rim. The wheel configuration of the present invention bulges in the opposite direction instead, toward the outboard direction. This configuration maximizes the internal wheel volume and provides maximum space for integrating a gear and motor assembly to fit substantially completely within the wheel space provided.

The main part of wheel 10 supports a tire (not shown in FIG. 2) on tire flanges 12 and 14 and is connected to the motor assembly structures through bearings 16 and 18, as will be explained below.

Figure 3:
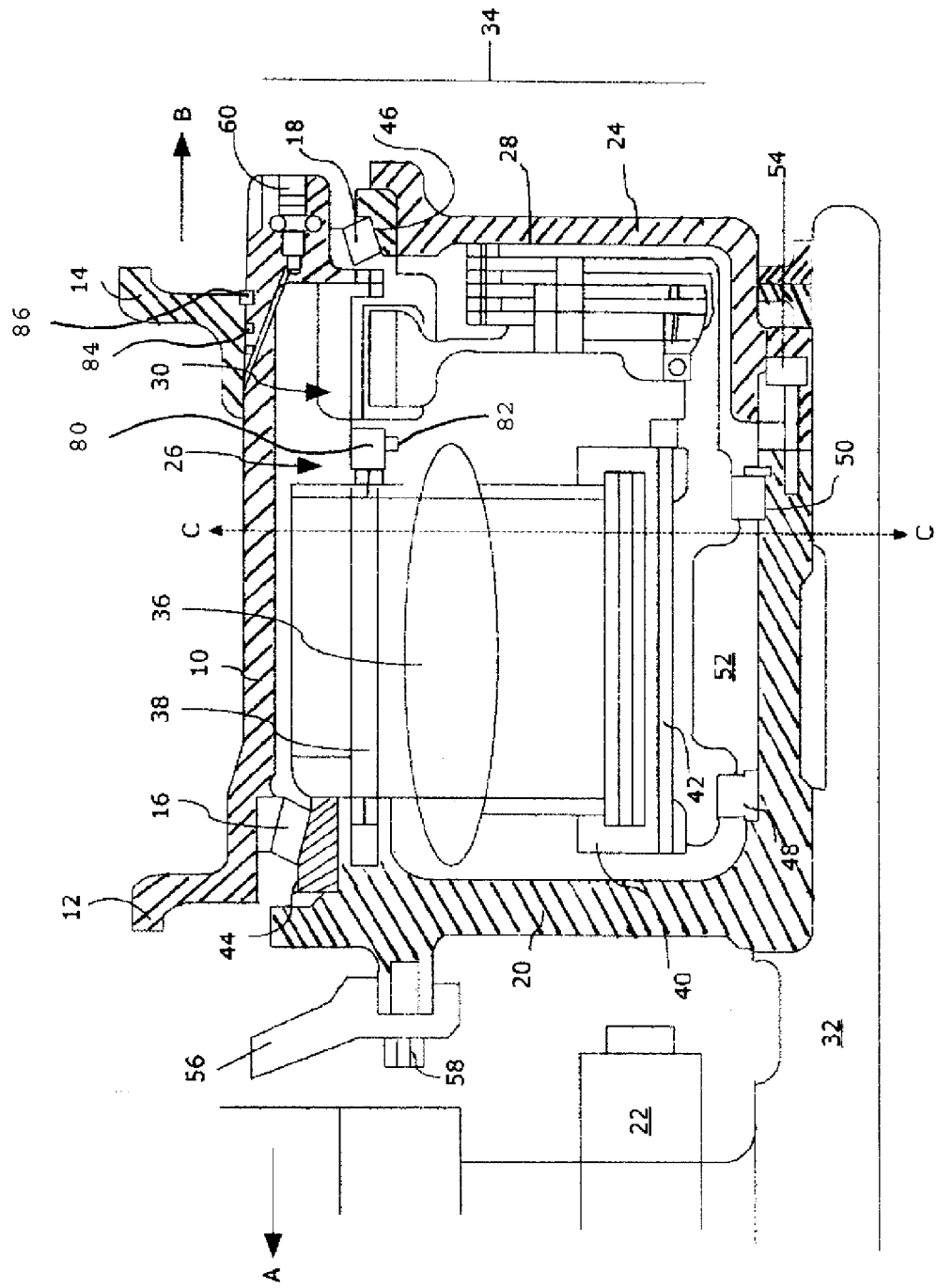
FIG. 3 is a diagrammatic illustration of a second embodiment of a motor assembly and gear system integrated within a wheel according to the present invention.

A support wall or side plate 20 is the inboard, or inside, support wall for the wheel 10. Unlike in a conventional wheel, the support wall 20 does not rotate. The shape and location of wall 20 are selected so that this structure is located as close as possible to the landing gear piston 22. Although not shown, a pass-through for wiring, preferably in the form of a wiring harness, is provided in wall 20. This wiring optimally provides a single connector through the wheel configured to serve all of the electric functions and wiring for the wheel and geared motor assembly. An outboard, or outside, support wall or side plate 24 is located opposite the inboard support wall 20. As shown in FIGS. 2 and 3, a motor assembly 26 is enclosed completely within the wheel boundaries formed by the respective inboard and outboard support walls 20 and 24. While the motor assembly support walls 20 and 24 are preferably formed of steel, other materials that are suitable for use in this environment could also be used for this purpose.

In the embodiments shown in FIGS. 2 and 3, the motor assembly 26 includes a stator 36, preferably mounted by a precision fitted flanged tube 38 to ensure the alignment of the stator stack. Multiple bolts, screws, or other suitable fasteners (not shown) are preferably provided to hold the stator to the wheel inboard support wall 20. One preferred arrangement uses about six to eight high strength, high torque bolts to connect the stator 36 to the inboard support wall 20. A rotor 40 is shown mounted on a splined shaft 42. Bolts (not shown) are preferably provided to squeeze the rotor stack together. While this arrangement of rotor and stator components is preferred, other rotor and stator designs that are configured to fit within the wheel well volume are also contemplated to be within the scope of the present invention.

It is preferred that the motor assembly be a totally enclosed machine capable of operating for about 5 to 10 minutes at maximum torque and for 30 to 40 minutes at cruise torque, relying primarily on the motor itself as the heat sink. An electric motor preferred for use with the wheel and motor driver assembly of the present invention could be any one of a number of designs, for example an inside-out motor attached to a wheel hub in which the rotor can be internal to or external to the stator, such as that shown and described in U.S. Patent Application Publication No. 2006/0273686, the disclosure of which is incorporated herein by reference. A toroidally-wound motor, an axial flux motor, or any other electric motor geometry known in the art is also contemplated to be suitable for use in the present invention.

The electric motor selected should be able to move an aircraft gear wheel at a desired speed and torque. One kind of electric drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving a gear wheel to move an aircraft on the ground, including but not limited to electric induction motors, permanent magnet brushless DC motors, and switched reluctance motors may also be used. Other motor designs capable of high torque operation across the desired speed range that can be integrated into an aircraft wheel to function as described herein may also be suitable for use in the present invention. A particularly preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum speed of about 28 miles per hour (mph) can be achieved.

It is preferred that an airgap of about 1 mm is maintained in the motor assembly by insuring that indexing surfaces of the rotor and stator are precisely formed. Because the rotor 40 in the present motor assembly preferably does not rotate, even if the stator 36 and rotor 40 touch during shock loads, damage to the motor assembly should be avoided.

The motor assembly 26 is drivingly connected to a gear system 28. While the preferred gear system 28 is a system of planetary gears as shown, any other type of gear system that can function for the desired purpose could also be employed. One preferred arrangement employs at least four high strength steel planetary gears at each stage to achieve a gear ratio of approximately 20:1. Other appropriate gear ratios could also be used and are contemplated to be within the scope of the present invention. Integrating a gear system, such as planetary gear system 28, with the motor assembly 26 permits the motor assembly to run more effectively at higher revolutions per minute (rpm).

The motor driver assembly 26 is preferably not attached to the wheel 10 at all times during operation. To achieve this, a clutch 30 is preferably provided to selectively engage and disengage the gears 28 and, thus, the motor assembly 26 from the wheel as required. Employing a clutch to disconnect the drive motor from the wheel at touchdown would minimize spin-up load. A motor that does not require a clutch could also be installed within the wheel as shown and is contemplated to be within the scope of the present invention.

FIG. 3 shows a second embodiment of a motor assembly and gear system in accordance with the present invention. The same reference numbers are used in FIG. 2 and in FIG. 3 to designate identical structures. In the embodiment shown in FIG. 3, the clutch 30 is driven by a solenoid 80 that locks the gear train of the gear assembly 28 to the wheel 10. A wheel speed sensor 82 is preferably installed in the solenoid, but could be installed anywhere within the present assembly facing a moving wheel component. Such sensors are known in the art and could be selected from any commercially available (COTS) solution. The wheel speed sensor 82 will allow the motor assembly 26 to engage after the motor speed is synchronized with the wheel speed. This permits considerable clutch and solenoid operation flexibility and can reduce interface wear to negligible levels.

In an additional variation of the present geared motor assembly that is not shown, rotor 40 could have a conical shape, which would cause the airgap to be about 1 mm when the rotor 40 is engaged and about 0.25 inch when it is not engaged. A solenoid might not be needed with this design.

The wheel 10 and motor assembly 26 preferably rest on and are supported by the landing gear wheel axle 32, as shown. Other arrangements whereby a motor assembly may be supported within a gear wheel relative to an axle may also be employed.

Maximum space is provided for the structures of the motor assembly 26 and gear system 28 by locating the inboard and outboard wheel support walls 20 and 24 as far away from the midpoint, represented by the line C-C, of the wheel 10 and axle 32. The outboard support wall 24 must be positioned to avoid coming into contact with the narrowest part of the wheel well or landing gear doors, which is represented by the vertical boundary line 39. The outboard support wall 24 may be located a selected distance inboard of the wheel well boundary line 34, as shown, or further outboard, if required.

The inboard wheel support wall 20 and the outboard wheel support wall 24 are provided with notches 44 and 46, respectively, shaped to receive bearings 16 and 18. These large bearings allow removal of the wheel 10 without removing any other hardware, thereby facilitating inspection of these bearings. The use of large bearings permits more travel and more evenly distributed loads, which enhances bearing life. The motor assembly and gear system of the present invention are not intended to be structural elements or part of a shock chain. These structures are preferably designed to handle about three times the shock load of the current bearings.

The wheel support walls 20 and 24 are coupled together through the notches 44 and 46 to ensure sufficient axial play that the bearings 16 and 18 can be preloaded. Additional bearings 48 and 50 near the axle 32 support the motor assembly 26 on an axle-contacting extension 52 of the inboard support wall 20 that may be keyed to the outboard support wall 24. Bolts or suitable fasteners, such as bolt 54, are provided to hold the support walls together so the entire wheel and motor assembly can be removed as a unit. The bearings 48 and 50 will require occasional removal for lubrication. These bearings could also be preloaded through an axle nut (not shown) or by way of bolt 54 or other bolts (not shown) that may be employed to connect the inboard and outboard support walls. Alternatively, the inboard and outboard support walls 20 and 24 could be machined as a single, integral structure. One or both of the inboard or outboard support walls could be completely or partially replaced by one or more of the motor driver components. For example, the stator 36 could replace support wall 20, and/or the gear system 28 could replace support wall 24.

A torque arm 56 configured to be connected at one end by a bolt 58 or like fastener to the inboard support wall 20 provides a mechanical connection between the motor components and a non-rotating landing gear structure to provide for a torque reaction. Examples of non-rotating landing gear components that could be connected to the opposite end of the torque arm 56 are tow fitting ears or a tow jack (not shown). All torque goes out from the arm 56. As stator support is grounded back to the torque arm 56, the bolts (not shown) connecting the stator 36 to the inboard support wall could also be used as a torque device.

A valve stem 60 is positioned above bearing 18 and the outboard support wall 24 to allow easy access to the wheel tire and valve (not shown) to check tire pressure and inflate the tire, if necessary. The valve stem can be accessed from the outboard side of the wheel without interfering with the motor drive assembly. Moreover, the arrangement of the motor driver assembly 26 within the wheel 10 of the present invention makes changing a tire mounted on the wheel a significantly easier process than changing a tire on existing aircraft wheels. The motor assembly and gear system do not have to be removed from the aircraft and can stay in place within the wheel as shown in FIGS. 2 and 3. As a result, the amount of wheel mass that must be removed from the aircraft during a tire change is reduced considerably, since the bulk of the inboard support wall supports motor mass that can stay connected to the aircraft. In addition, the use of a low profile tire, such as that disclosed in International Patent Application No. WO 2008/027458, the disclosure of which is incorporated herein by reference, can also help maximize the space available inside the wheel well.

In contrast to tire flange 12, tire flange 14 is designed to be a demountable flange to provide more space for the motor assembly. O-ring grooves 84 and 86 (FIG. 3) are provided adjacent to the demountable flange 14 for an air seal (not shown). This arrangement further facilitates tire changes. Additionally, it effectively seals the motor driver assembly from contaminants, such as water, ice, and snow, and highly corrosive materials, such as the deicing chemicals and hydraulic fluids commonly used at airports.

Not only are tire changes easier with the wheel and motor driver assembly of the present invention, but servicing the motor driver assembly can be performed without disconnecting electric connections between the motor assembly 26 and a wire harness (not shown) that leads into the aircraft fuselage. Moreover, the wheel and motor driver assembly shown in FIGS. 2 and 3 is configured to permit easy access to motor components, such as the stator 36, rotor 40, or bearings 16 and 18, after simply removing the wheel 10. Preferably, the bolts closest to the axle 32, such as bolt 54, and the outboard support wall 24 are removed, which allows the wheel to be moved away from the motor assembly 26. The entire wheel and geared motor assembly can be easily removed, if needed, for remote servicing by disconnecting the assembly from an axle using the axle nut and spacer (not shown). The axle nut and spacer used in the present design are the same as the axle nut and spacer components currently used in existing aircraft and do not have to be changed.

A major advantage of the design of the wheel 10 and motor driver assembly 26 is achieved by the continued use of the existing tires, axle 32, and piston 22 already in use on an aircraft. Since these structures are not altered from their original condition or otherwise changed in any way by the installation of the present wheel and motor driver assembly, the rim width, tire bead, and bead seat would not require re-certification by the FAA or other authorities, thus eliminating a potentially time consuming and costly process. As a result, the wheel and motor driver assembly described herein is especially well suited for installation on existing aircraft.

Another advantage of using the wheel and motor assembly design of the present invention in an aircraft landing gear assembly is the ability to minimize spin-up loads for the wheel by removing considerable motor mass as compared to existing landing gear designs that include motors. The motor is able to spin-up and match the wheel speed before the clutch is engaged. This allows the electric drive to connect or disconnect as required without bringing the aircraft to a halt before engaging or disengaging the motor assembly 26 and gear system 28.

A further advantage presented by the wheel and geared motor assembly shown in FIGS. 2 and 3 is the solid thermal connection between the motor driver assembly and the axle and piston hardware. Relying primarily on the motor assembly as the heat sink keeps the motor environment cleaner than other arrangements. The solid thermal connection described enables the shedding of heat through those large metallic components. Other arrangements for dissipating heat in a motor-driven aircraft gear wheel could also be used to enhance the heat dissipation by the thermal connection. An example of a system that can be employed effectively to cool wheel motors is described in U.S. Patent Application Publication No. US2009/0152055, which is incorporated herein by reference. This system includes providing a rotor with fan-shaped projections or, alternatively, holes or tunnels, in connection with a fan, to conduct warm air from inside the motor assembly and wheel to the outside.

The geared motor assembly of the present invention is integrated with an aircraft gear wheel to drive the aircraft on the ground, preferably completely without the use of the aircraft main engines. A preferred source of power for the present geared motor assembly is the aircraft auxiliary power unit (APU). The present geared motor assembly is capable of operating on about 45 kVA per wheel, and the wiring harness (not shown) described above in connection with the inboard support wall 20 should be able to handle this amount of electrical power, although during normal operation the amount of power used per wheel is likely to be closer to 15 kVA.

A cockpit interface (not shown) is preferably electrically and drivingly connected between the aircraft APU and the present geared motor assembly to activate and control the motor assembly to drive the aircraft on the ground from the cockpit. The preferred interface includes a switch with at least two levels of "ON" settings. A first "ON" setting turns on an associated computer system, fans, and the like, and powers the wheel speed sensor 82 (FIG. 3) to determine whether full activation of the geared wheel motor assembly is safe.

The motor assembly and gear system of the present invention is designed so that the motor assembly 26 and gear system 28 are not connected and automatically disconnect whenever the motor assembly 26 is not receiving electrical power. This prevents the engagement of the motor assembly 26 in flight or before the aircraft is active on the runway. The present motor assembly and gear system are not intended to be connected or operational when the aircraft is in flight. If the motor assembly and gear system, for whatever reason, did not disconnect and were connected during flight, this would be detected, preferably through a cockpit interface, before the aircraft was active on the runway. The solenoid 80 provides an active way to "goose" the motor assembly 26 and gear system 28 connection and to disconnect then through the clutch 30, should these components fail to disconnect when required. The motor assembly and gear system of the present invention is designed to prevent engagement of the motor assembly 26 and gear system 28 at wheel speeds higher than about 28 to 30 mph, which keeps tangential motor speeds at safe levels.

None of the foregoing advantages or any of the other advantages presented by the geared wheel assembly of the present invention are demonstrated by prior art aircraft landing gear wheel and motor designs. The wheel and integrated geared motor assembly of the present invention has been described in connection with a single aircraft gear wheel. This assembly can also be used simultaneously on more than one aircraft wheel, including one or more of the nose wheels or the other aircraft wheels.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in retrofitting existing aircraft to integrate effective and efficient wheel and geared motor assemblies substantially completely within an aircraft wheel well without modifying existing landing gear components when it is desired to provide the advantages and benefits that can be achieved by powering aircraft gear wheels to drive an aircraft on the ground.

The invention claimed is:

1. A wheel and geared motor assembly configured to fit substantially completely within existing wheel well space in an existing aircraft landing gear, wherein a wheel is supported on an axle by opposed support wall means for supporting said wheel and defining a volume within said wheel well, and a motor assembly means for driving said wheel on the ground and a gear system means for driving said motor assembly means are supported within the defined volume between said opposed support wall means, wherein said wheel and geared motor assembly is configured to fit within said defined volume in a landing gear wheel in an existing aircraft without changing the existing aircraft landing gear tires, axle, or piston.

2. A wheel and geared motor assembly as described in claim 1, wherein said opposed support wall means comprises an inboard support wall connected to an outboard support wall, and said inboard support wall and said outboard support wall are spaced apart a distance selected to maximize said defined volume.

3. A wheel and geared motor assembly as described in claim 2, wherein said motor assembly means and said gear system means are supported by said inboard support wall and said outboard support wall, respectively.

4. A wheel and geared motor assembly as described in claim 2, wherein said motor assembly means comprises a rotor element and a stator element and at least one of said rotor element or said stator element is mounted on said inboard support wall.

5. A wheel and geared motor assembly as described in claim 2, wherein said wheel is supported on each of said inboard and outboard support walls by a pair of bearing means supportingly contacting said wheel and configured to fit within correspondingly configured notches in each of said support walls.

6. A wheel and geared motor assembly as described in claim 4, wherein said rotor element is supported by said inboard support wall and said inboard support wall includes torque arm means to provide for a torque reaction.

7. A wheel and geared motor assembly as described in claim 1, wherein said support wall means comprises an inboard support wall and an outboard support wall spaced apart to define a volume that substantially fills said wheel well and completely encloses said motor assembly means and said gear system means.

8. A wheel and geared motor assembly as described in claim 1, wherein said motor assembly means comprises an electric motor selected from the group consisting of axial flux motors, toroidally wound motors, electric induction motors, permanent magnet brushless DC motors, and switched reluctance motors.

9. A wheel and geared motor assembly as described in claim 1, wherein said gear system means includes gear means drivingly connected to said motor assembly means and clutch means operatively disposed between said motor assembly means and said gear system means.

10. A wheel and geared motor assembly as described in claim 9, wherein said solenoid means actuatable to drive said clutch means to selectively engage said motor assembly means and said gear system means to drive the wheel on the ground and disengage said motor assembly means from said gear system means when the wheel is not on the ground.

11. A wheel and geared motor assembly as described in claim 10, further including sensor means for measuring the speed of said wheel on the ground.

12. A wheel and geared motor assembly as described in claim 1, wherein said gear system means includes an arrangement of planetary gears connected to clutch means operatively disposed between said gear system means and said motor assembly means.

13. A wheel and geared motor assembly as described in claim 1, wherein said wheel includes a pair of spaced flange means for mounting a tire on said wheel.

14. A wheel and geared motor assembly as described in claim 13, wherein said spaced flange means includes an inboard flange formed integrally with said wheel and an outboard flange demountable from said wheel.

15. A wheel and geared motor assembly as described in claim 1, wherein said wheel is an aircraft nose wheel.

16. A wheel and geared motor assembly as described in claim 1, configured to fit within said defined volume in a landing gear wheel in an existing aircraft without changing the existing aircraft landing gear tires, axle, or piston.

17. A wheel and geared motor assembly as described in claim 1, wherein said motor assembly means and said support wall means are configured to conduct heat generated by driving said wheel away from said motor assembly means.

18. A wheel and geared motor assembly as described in claim 1, further including cockpit interface means operative to activate said motor assembly means and said gear system means when activation of said motor assembly means and said gear system means is indicated to be safe.

* * * * *